United States Patent [19]

Freestone

[11] B 3,989,891

[45] Nov. 2, 1976

[54] LINE SELECTION CIRCUIT FOR A TELEVISION RECEIVER

[75] Inventor: Harry T. Freestone, Portsmouth, Va.

[73] Assignee: General Electric Company, Portsmouth, Va.

[22] Filed: Sept. 24, 1974

[21] Appl. No.: 508,817

[44] Published under the second Trial Voluntary Protest Program on February 3, 1976 as document No. B 508,817.

[52] U.S. Cl. ............................. 178/7.5 R; 358/10
[51] Int. Cl.² ...................... H04N 5/44; H04N 9/62
[58] Field of Search ............ 178/7.3 R, 7.5 R, 7.3 S, 178/7.5 S, 69.5 TV; 358/10, 21, 28

[56] References Cited
UNITED STATES PATENTS

| | | | |
|---|---|---|---|
| 2,615,979 | 10/1952 | Abbenhouse | 178/7.5 S |
| 3,423,525 | 1/1969 | Baun | 178/7.3 R |
| 3,502,804 | 3/1970 | Barr | 178/7.5 R X |
| 3,780,218 | 12/1973 | Rennick | 358/28 |

OTHER PUBLICATIONS
Type 529 Waveform Monitor Instruction Manual, Tektronix, Inc. 1965.

*Primary Examiner*—Howard W. Britton
*Assistant Examiner*—Mitchell Saffian

[57] ABSTRACT

A line selector circuit for a television receiver identifies a predetermined horizontal line. The line to be identified desirably occurs during the vertical blanking interval subsequent to the vertical sync interval contained therein. A line of particular current interest is line 19 which contains reference information which can be used for automatic control of the receiver. The predetermined line is identified through the generation of a timing period which is initiated by a sync pulse synthesized by the summation of horizontal and vertical rate information. The timing period is terminated by horizontal sync information at the beginning of the predetermined line. The timing period is generated by a one-shot multivibrator having a first threshold circuit responsive to the synthesized sync pulse designed to initiate the timing period during the same line in the vertical sync interval of either field. The timing period is terminated prior to the natural delay of the one-shot when the amplitude of the timing waveform of the one-shot which determines the natural delay of the one-shot is modified by added horizontal sync pulses to trip a second threshold circuit in the one-shot. The natural time constant and the amplitude of the horizontal sync pulses are set so that the horizontal sync pulse at the beginning of the predetermined line will terminate the timing period.

6 Claims, 3 Drawing Figures

LINE SELECTION CIRCUIT FOR A TELEVISION RECEIVER

BACKGROUND OF THE INVENTION

The present invention relates to a line selection circuit for selecting a horizontal line within a raster of transmitted video information. More particularly, the invention relates to a line selection circuit for a color television receiver which will select a line during the vertical blanking interval, such line, for example, is one containing reference information for the automatic control of the television receiver.

U.S. Pat. No. 3,780,218 issued Dec. 18, 1973 to John L. Rennick describes a circuit for automatically setting the hue in a color television receiver by utilizing a vertical interval reference signal (VIR signal) contained in one of the horizontal lines in the received video information. The Rennick patent describes a circuit for identifying the line containing the VIR signal to enable circuitry in the receiver to respond to the VIR signal.

Since no recognizable information is transmitted to identify a particular line, such as the line containing a VIR signal, and since many lines could contain reference information for different purposes, it is necessary, as the aforementioned Rennick patent indicates, to provide a line selecting and identifying circuit for a television receiver if automatic control by means of a reference signal contained in a particular line is to be achieved.

The line selection circuit shown by the Rennick patent employs digital circuitry practical only with the use of integrated circuits. However, since the use of an approach solely dependent upon integrated circuits may be undesirable either due to cost or timing, it is accordingly an object of the present invention to provide a line selection circuit adaptable to fabrication with discrete components or integrated circuits.

It is another object of the present invention to provide a line selection circuit that is not frustrated by the interlace between the fields in each frame of the televised signal.

Another object of the present invention is to provide a line selection circuit in which horizontal sync information is utilized to initiate and terminate the timing period between a first line and the desired line, thereby avoiding the need for precise timing circuitry.

These and other objects are achieved by the present invention by the provision of integration means responsive to the sync information in the received video signal to emphasize the vertical sync information in each field relative to the other sync information thereby forming a vertical sync pulse for each field. Since the vertical sync pulse for the even field differs in position from the vertical sync pulse of the odd field relative to the line numbers by one-half line (necessary for the interlace of the two fields), this pulse alone is not sufficient to initiate the timing period for the selection of the desired line. This problem is overcome by adding horizontal sync information to the vertical sync information to derive a composite sync pulse for each field. The composite pulse is utilized to trigger first threshold means contained in a first one-shot multivibrator. The composite pulse triggers the one-shot to change its state of conduction on the same line in each field, thereby overcoming the interlace which would otherwise cause the initiation of timing period to be a half line different on successive fields. The one-shot is selected to have a timing period that would nominally terminate within the desired line. Precise termination of the timing period is achieved by adding horizontal sync information to the normal timing pulse of the one-shot so that the timing period is sharply terminated at the beginning of the desired line. In this manner, the requirements for precise termination of the timing period that would ordinarily be placed on the multivibrator are avoided and an ordinary low tolerance device can be employed. A second one-shot multivibrator responding to the termination of the timing period may also be used to generate an activation pulse to activate circuitry to respond to the information contained on the predetermined line, the activation pulse lasting for the duration of the predetermined line.

BRIEF DESCRIPTION OF THE DRAWINGS

A more complete understanding of the invention, its objects and features may be obtained from the following detailed description taken in conjunction with the drawings in which.

DETAILED DESCRIPTION

Figure 1:
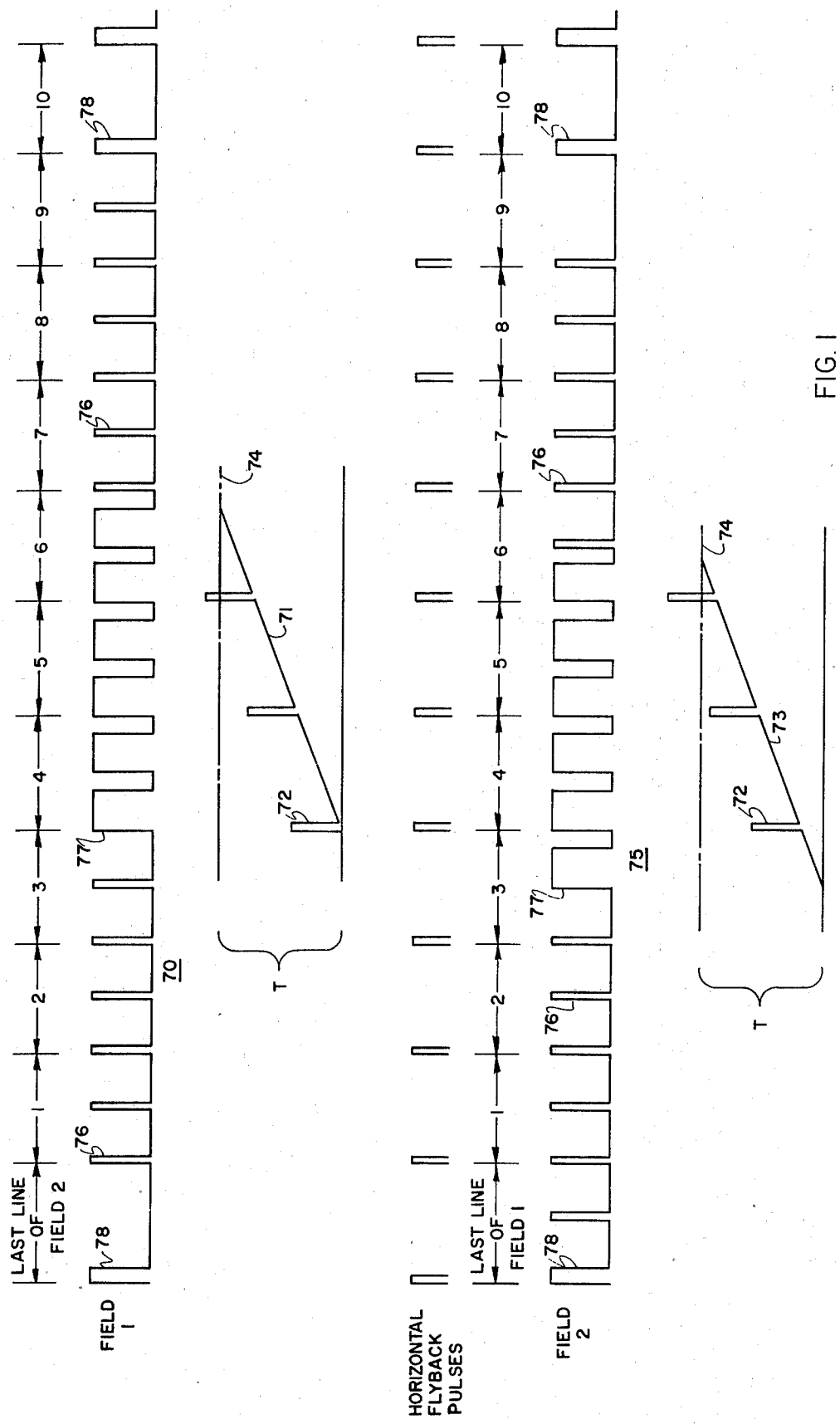
FIG. 1 is a detail of sync information during the vertical blanking interval and also shows the waveform of the composite pulse generated in accordance with the present invention.

Referring now to the drawings, there is shown in FIG. 1 a portion of the blanking interval of the even and odd fields of a frame. Looking first at the interval 70 shown for Field 1 it is seen that the first, second and third lines, indicated by the numbers 1, 2 and 3, occur during the reception of equalizing pulses 76. The fourth, fifth and sixth lines occur during the reception of vertical interval pulses 77. The seventh, eighth and ninth lines occur during the receipt of equalizing pulses 76, and beginning with the tenth line normal. horizontal sync pulses 78 are being received. Examination of the figure for the sync information received during the second field 75 shows that there is a half line displacement between the line numbers of the first and second fields relative to the vertical sync pulse interval which permits the familiar interlace between the two fields. Otherwise, field 2 is identical to field 1.

It will be noted that the vertical pulse interval occurring during lines 4, 5 and 6 is a unique interval in that during this interval the sync pulses 77 have the highest duty cycle of all the synchronizing information and accordingly is highly susceptible to integration to provide the vertical sync pulses 71 and 73, as shown immediately below the pulse waveform renditions for fields 1 and 2. This integrated waveform extending from the beginning of the vertical pulse interval to its end is ramp like in shape and provides a unique indication of three particular lines of the 262 half lines in each field. It is noted, however, that this vertical pulse for field 1 begins at line 4 whereas the same pulse for field 2 begins at the mid-point of line 3. Likewise the vertical pulse for field 1 ends at the end of line 6 while the pulse for field 2 ends midway in line 6. Thus, it can be seen that if the vertical pulse alone were to be used to initiate a timing period to identify a subsequent horizontal line, a half line error between field 1 and field 2 will be realized due to the interlace problem.

In accordance with the present invention, vertical interlace is overcome by the superposition of horizontal flyback pulses onto the vertical sync pulse. Inasmuch as the flyback pulses occur at the beginning of each line within each field, it is possible through the combination of vertical sync with horizontal sync to identify the same line within either field to initiate the start of a timing period to find any other line within the field.

Figure 2:
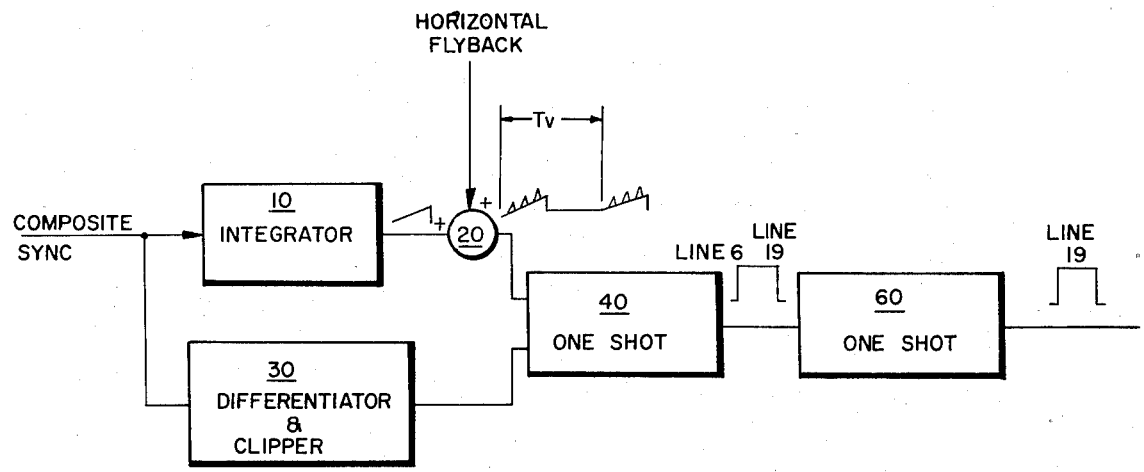
FIG. 2 is a block diagram of a preferred embodiment of the present invention.

Referring now to FIG. 2, there is shown a preferred embodiment of the invention wherein the technique of superposition of vertical and horizontal pulse information initiates the timing period for the finding of any line at the same line within either field. Composite sync information such as shown in FIG. 1 which includes the sync information of both fields 70 and 75, are applied to an integrator 10 which derives the vertical pulses 71 and 73 as shown in FIG. 1 and again denoted at the output of the integrator in FIG. 2. To each vertical pulse horizontal flyback pulses are added in superposed manner by means of adder 20, the output of which is again shown in FIG. 2. These composite pulses are applied to a first input of one-shot multivibrator 40. Multivibrator 40, as will be described in greater detail with regard to FIG. 3, has a first threshold circuit responsive to the composite pulses and designed such that triggering occurs by the same horizontal superposed pulse in each field to initiate the timing period of the multivibrator.

Figure 3:
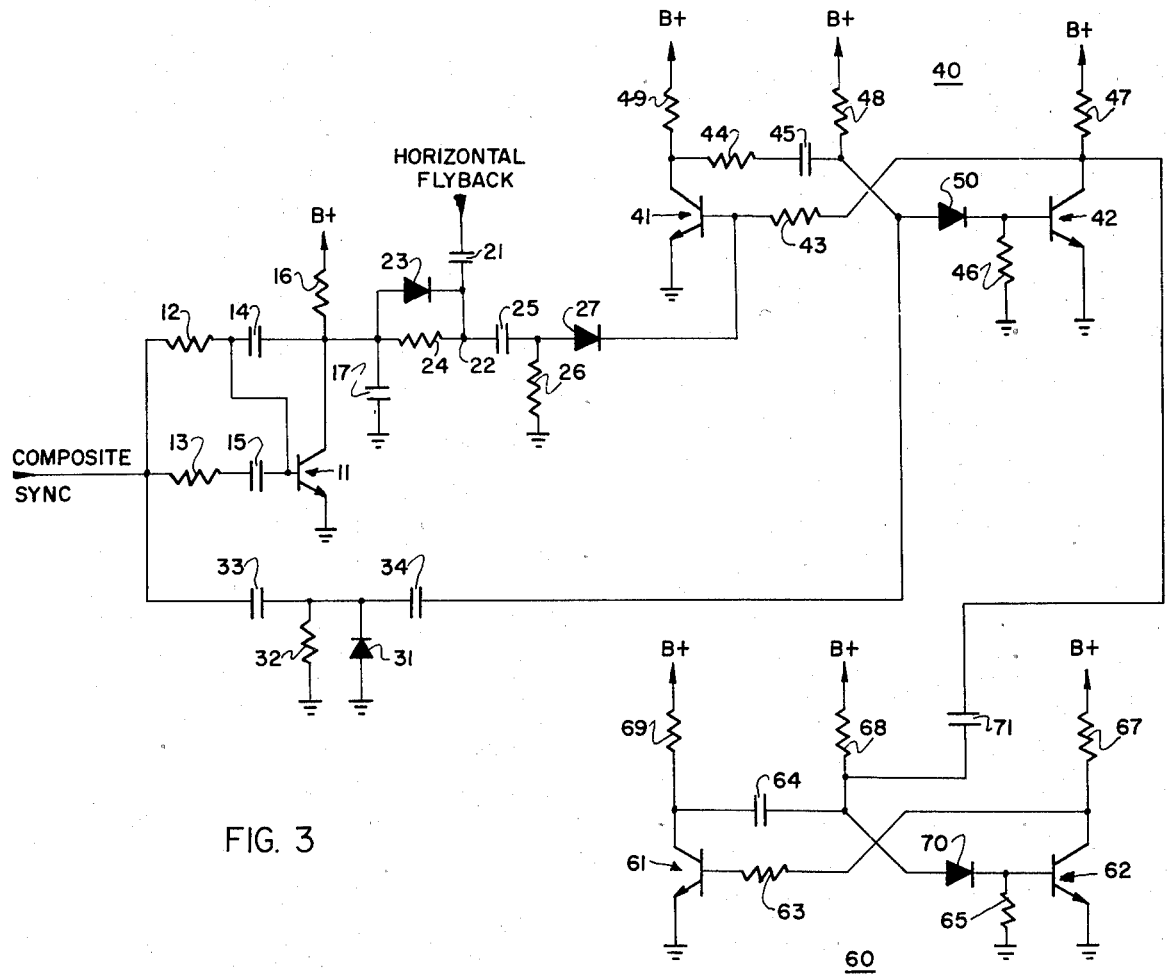
FIG. 3 is a circuit diagram of a preferred embodiment of the present invention.

The timing period of one-shot multivibrator 40 is nominally set to terminate during the line that is desired to be selected, e.g. line 19 containing the VIR signal. Normally a one-shot multivibrator is used to establish by its time constant circuit a fixed period of delay or time. Such use of a multivibrator in the line selection circuit of the present invention would require a very precise time period, one that would be initiated at the beginning of line 6 (or line 5) during the vertical pulse interval and terminate precisely at the beginning of line 19. Such tolerance requirements for the timing pulse of this multivibrator would require precise components and would be quite expensive and difficult to fabricate. It would be very susceptible to errors due to aging and temperature change. Accordingly, precise termination of the timing period of the line selection circuit is provided by the present invention without resort to precise expensive timing circuitry. Precise termination of the timing period is achieved by applying horizontal sync information to terminate the timing period. This can be achieved either by the utilization of horizontal sync pulses or by horizontal flyback pulses. In FIG. 2 a differentiator and clipper circuit 30 is shown responding to the composite sync information to apply horizontal sync pulses of controlled amplitude and crispness to a second input of one-shot multivibrator 40. These horizontal sync pulses, as will be described more fully with regard to FIG. 3, are utilized to terminate the timing period precisely at the beginning of the line to be selected in much the same fashion as the timing period initiation. In FIG. 2 the output of the one-shot multivibrator 40 is shown extending from line 6 to the start of line 19. A second multivibrator 60 responds to the termination of the output pulse from multivibrator 40 to provide a pulse for the duration of the selected line, i.e., line 19. This pulse may be used for the activation of circuitry, which responds to the VIR signal contained in line 19.

FIG. 3 illustrates schematically the circuits illustrated in block diagram form in FIG. 2. Integrator 10 comprises a transistor 11 having its input connected to the source of composite sync pulse through a series connected resistor 13 and capacitor 15. The composite signal is doubly integrated. First integration is obtained by capacitor 14 connected between the collector and base of transistor 11. A second integration is effected by capacitor 17 connected across the output of transistor 11. Double integration is a matter of choice to provide better integration, and single stage integration may be employed instead as determined by design requirements.

The summing circuit 20 is comprised of a coupling capacitor 21 which couples the horizontal flyback pulses to a summing junction 22. Diode 23 connected across resistor 24 connects the output of transistor 11 to the summing junction and prevents the horizontal flyback pulses from seriously affecting the integrating function. To this end, diode 23 makes the circuit look like an adder to the incoming flyback pulses so that the pulses at the summing junction would appear superposed on the rising ramp voltage pulses from integrator 11. The output of the summing junction is coupled to one-shot multivibrator 40 via coupling network capacitor 25, diode 27 and resistor 26.

The differentiator and clipper 30 of FIG. 2 are shown in FIG. 3 by an RC circuit comprised of capacitor 33 and resistor 32 which provide the differentiating function. The clipping function is provided by diode 31 which is coupled on one-shot multivibrator 40 via capacitor 34. The input to capacitor 33 is the same composite sync input applied to integrator 10. The output of capacitor 34 is a series of horizontal synchronizing pulses.

One-shot multivibrator 40 comprises transistors 41 and 42. Transistor 41 in its quiescent state is normally off and transistor 42 is normally on. The output of diode 27, a positive going ramp with superposed horizontal pulses is applied to the base of transistor 41 and causes that normally nonconducting transistor to conduct when the 0.7 volt threshold occasioned by the base-emitter diode is overcome. As indicated by the dashed line 74 in FIG. 1, this threshold T is overcome by the horizontal pulse in both fields occurring at the beginning of line 6. By control of the slope of the vertical pulse, the amplitude of the horizontal pulses and the height of the threshold, transistor 41 may be turned on either at the beginning of line 5 or line 6.

The triggering of transistor 41 into conduction in turn causes transistor 42 to be cut off. This produces a positive pulse at the output of the multivibrator which has a duration that is normally principally determined by capacitor 45 and resistor 48. Diode 50 allows a large negative excursion at its anode when transistor 41 turns on. This negative voltage at diode 50 anode gradually returns in a positive direction due to the charging of capacitor 45. Added to this ramp voltage are positive horizontal sync pulses applied from capacitor 34. When the combined voltage of the ramp plus a sync voltage pulse is sufficiently positive (such as by design at line 19) to overcome the threshold occasioned by diode 50 and the base-emitter diode of transistor 42, transistor 42 turns on again returning multivibrator 40 to its quiescent state. The output of one-shot multivibrator 40 taken from the collector of transistor 42 is applied to one-shot multivibrator 60 via capacitor 71.

One shot multivibrator 60 comprises transistors 61 and 62 and RC components 64 and 68 which determine the time duration of the pulse produced by the multivibrator when triggered. Diode 70, like diode 50, allows a large negative excursion at its anode when normally OFF transistor 61 turns ON. When the negative going edge at line 19 from one-shot multivibrator 40 is applied to diode 70, normally ON transistor 62 is turned OFF and normally OFF transistor 61 is turned ON. The one-shot multivibrator 60 remains in this state for a period of approximately 63.5 sec to produce the line 19 pulse.

While a particular embodiment of the present invention has been shown and described, it will of course be obvious to one skilled in the art that certain changes and modifications may be affected without departing from the spirit of the invention, and accordingly, it is intended that the scope of the invention be not determined by the foregoing examples, but only by the scope of the appended claims.

What is claimed and desired to be secured by Letters Patent of the United States is:

1. A line selection circuit for a television receiver for identifying a predetermined line in the even and odd fields of a frame of a received television signal comprising:
    means for extracting a vertical sync pulse from both fields of the television signal,
    means for deriving line rate pulses,
    means for combining said line rate pulses with the vertical sync pulses to derive a first signal of repetitive alternating even and odd field trigger pulses,
    controllable timing means,
    means coupling said first signal to said controllable timing means,
    said controllable timing means being responsive to said first signal for initiating a timing period at the same line during both fields, the timing period of said controllable timing means being designed to terminate within said predetermined line, and
    means for applying line rate pulses to said controllable timing means to effect a precise termination of the timing period corresponding to the beginning of said predetermined line and providing an output signal indicative of the beginning of said predetermined line.

2. The invention as recited in claim 1 further comprising line timing means coupled to said controllable timing means and responsive to said output signal to generate a pulse extending for the duration of said predetermined line.

3. The invention recited in claim 1 wherein said means for extracting a vertical sync pulse includes integrating means responsive to the sync information in said received television signal to emphasize the vertical sync pulse interval relative to the other sync information.

4. The invention recited in claim 3 wherein said means for combining comprises adding means for summing said vertical sync pulse with horizontal flyback pulses comprising said line rate pulses to obtain superposed horizontal and vertical rate information, and said controllable timing means includes first threshold means triggered by a predetermined one of the superposed flyback pulses so that said timing period is initiated at the same line during each field, whereby the half line interlace between even and odd fields is avoided.

5. The invention recited in claim 4 wherein said controllable timing means comprises a one-shot multivibrator containing second threshold means and time constant means establishing a timing pulse initiated upon the triggering of said first threshold means, and
    means to combine extracted horizontal sync pulses comprising said line rate pulses with said timing pulse,
    said second threshold means being responsive to the combined horizontal sync pulses and timing pulse to be triggered to terminate said timing period upon the recipt of the horizontal sync pulse corresponding to the beginning of said predetermined line.

6. A line selection circuit for a color television receiver for identifying the predetermined line in the received television signal containing a vertical interval reference signal, comprising:
    means coupled to said received television signal for integrating said received television signal to develop a vertical sync pulse from each of the odd and even fields,
    means for deriving horizontal flyback pulses,
    summing means,
    means coupling said horizontal flyback pulses and said vertical sync pulses to said summing means, said summing means summing said vertical sync pulses with said horizontal flyback pulses to obtain a composite horizontal and vertical sync pulse during each field,
    controllable timing means for generating a timing period terminating at said predetermined line, said controllable timing means having first threshold means and second threshold means,
    means coupling said composite horizontal and vertical sync pulses to said controllable timing means, said first threshold means being triggered by each composite pulse at the beginning of the same line in each field,
    said controllable timing means including time constant means generating a timing pulse initiated by the triggering of said first threshold means, the duration of said timing pulse being selected to terminate during said predetermined line,
    means coupling horizontal sync pulses and said timing pulse to said second threshold means such that the combined amplitude of said timing pulse and said horizontal sync pulses triggers said second threshold means at a predetermined one of said horizontal sync pulses to end said timing period at the beginning of said predetermined line, and
    line timing means coupled to said controllable timing means and responsive to the termination of said timing period to generate an activation pulse for the duration of said predetermined line to activate circuitry to respond to said vertical interval reference signal.

* * * * *